United States Patent

[11] 3,628,373

| [72] | Inventor | Paul T. Gilbert |
| | | Los Altos Hills, Calif. |
| [21] | Appl. No. | 50,462 |
| [22] | Filed | June 29, 1970 |
| [45] | Patented | Dec. 21, 1971 |
| [73] | Assignee | Beckman Instruments, Inc. |

[54] PRESSURE-MEASURING SYSTEM
10 Claims, 10 Drawing Figs.

[52] U.S. Cl. .................................................. 73/64.3, 73/398 R
[51] Int. Cl. ........................................................ G01n 11/00
[50] Field of Search .......................................... 73/64.3, 398 R, 406, 401; 350/295; 250/210, 209

[56] References Cited
UNITED STATES PATENTS
3,195,346  7/1965  Ehrmantraut et al. ........  73/64.3

Primary Examiner—Donald O. Woodiel
Attorneys—William F. McDonald and Robert J. Steinmeyer ABSTRACT: A pressure-measuring system including a pressure-responsive membrane formed by the interface between two immiscible fluids bounded by the edge of an orifice in a vessel. One of the fluids is a liquid. Means are provided for detecting the position of the membrane in response to a given pressure.

INVENTOR.
PAUL T. GILBERT

ATTORNEY

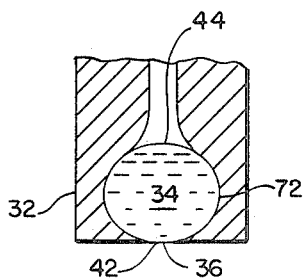
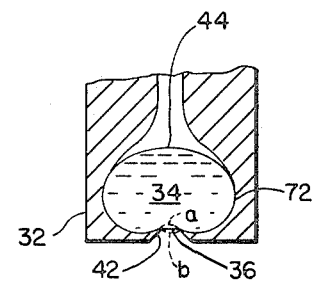
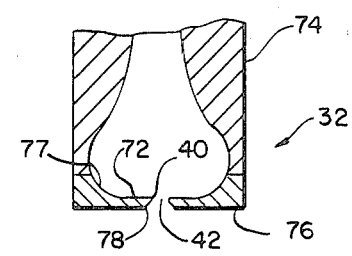
FIG. 2　　　FIG. 3　　　FIG. 4
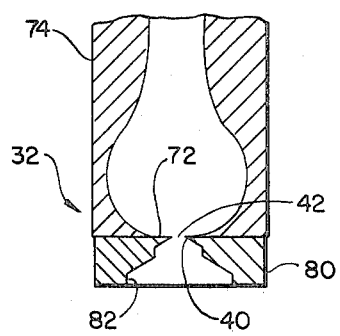
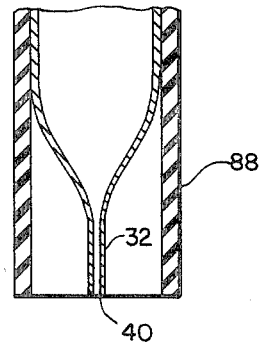
FIG. 5　　　FIG. 6
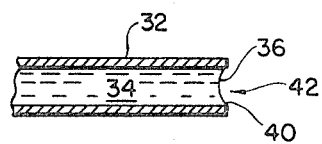
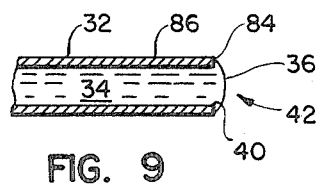
FIG. 7　　　FIG. 9
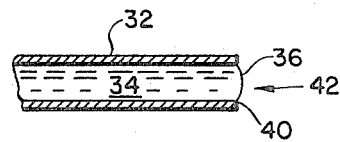
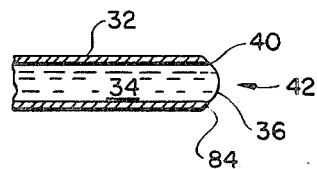
FIG. 8　　　FIG. 10
INVENTOR.
PAUL T. GILBERT
BY
William F. McDonald
ATTORNEY

3,628,373

PRESSURE-MEASURING SYSTEM

BACKGROUND OF THE INVENTION

The instant invention relates to pressure-measuring systems. It is specifically concerned with pressure-responsive membranes for use in such systems. More specifically, it is useful in connection with devices measuring the osmotic pressure of a solution, particularly such devices utilizing optical measuring systems.

A particularly effective device for measuring osmotic pressure is that known as the Hansen osmometer and described by A. T. Hansen in *Acta Physiol. Scan.*, 53,197 (1961). The Hansen osmometer requires a cell having an inner space filled with a reference solvent. An osmotic membrane is rigidly fitted to the cell with the outer surface of the membrane adapted to be in contact with the liquid solution whose osmotic pressure is to be measured. The inner surface of the membrane is in contact with the solvent. The only pressure differential felt across the membrane is the osmotic pressure differential. The osmotic pressure differential across the membrane is transmitted by the solvent to a transducer of some type and then measured.

This osmometer had attained the unprecedented time constant or response time of 5 seconds by virtue of the very high elastance (stiffness) with which its parts are assembled. Fast response demands very high elastance of the cell, its contents, and the two membranes. To attain a time constant as short as 1 second in the measurement of osmotic pressure with commercially available osmotic membranes, the pressure transducer would have to have an elastance of about 10 $\mu$b/pl. (microbars per picoliter). For many purposes high sensitivity is wanted in the measurement of osmotic pressure. A sensitivity of 1 $\mu$b, which is the osmotic pressure of a solution having a concentration of 0.04 micromoles per liter can be desirable. However, a pressure transducer that is to respond to a pressure change of 1 $\mu$b and yet possess an elastance of 10 $\mu$b/pl. must give a measurable response when the membrane suffers a volume displacement of only 0.1 pl. (100 cubic microns).

Membranes for pressure transducers suitable for the purpose described above have heretofore been made of solid materials. Such membranes have several inherent disadvantages. Most solids are imperfectly elastic. They suffer from creep and hysteresis. Even membranes made of borosilicate glass may show a small elastic aftereffect amounting to as much as 2 percent. It is extremely difficult to make two small, thin solid membranes nearly identical in diameter, thickness, elastance, linearity, and surface quality. Great skill and much selection and testing are needed to make two closely similar transducers. It is difficult to make a small solid membrane perfectly flat. An imperfectly flat membrane serving as mirror in an optical lever distorts the reflected beam with the result that the characteristics of a pressure transducer made with such a membrane are unpredictable and unreproducible from one membrane to the next. The calculation of the elastance of a solid membrane from its thickness and diameter is uncertain owing to large exponents in the theoretical equation, and it is vitiated by irregularities in the shape or thickness of the membrane. It is generally desirable to measure the elastance directly by interferometry, a troublesome and delicate procedure. Solid membranes often fail to conform to the theoretical relation between elastance and diameter and thickness. In particular, the elastance may vary with the pressure, imparting an inherent nonlinearity to the transducer. The small, thin solid membranes of the kind required for attainment of high elastance together with high sensitivity are fragile. They cannot be repaired if broken. When the membrane is replaced, the transducer must be recalibrated. It is very difficult to make a solid membrane much smaller than 1 millimeter in diameter; yet the attainment of the highest practical combination of elastance and sensitivity is facilitated with membranes considerably smaller than 1 mm.

SUMMARY OF THE INVENTION

The principal object of the instant invention is to provide a pressure measuring system having an extremely high figure of merit, defined here as the product of elastance and reciprocal pressure detection limit. The detection limit is governed by the noise level of the signal. The figure of merit may then be taken as the reciprocal of the volume displacement of the membrane that is equivalent to the root mean square noise. Pressure transducers according to the invention have figures of merit typically as great as 1 to 1,000 pl.$^{-1}$ (reciprocal picoliters).

The invention advantageously provides a pressure-measuring system in which, despite very high elastance, a small pressure change generates a large signal that can be easily measured.

Another advantage of the instant invention is that it provides a small, compact, and simple pressure-measuring system or transducer which is easy to assemble and adjust.

The instant invention provides a pressure-sensing membrane that overcomes the disadvantages of the conventional solid membranes used in pressure transducers of high elastance and sensitivity. The membranes according to the instant invention are perfectly elastic. They exhibit no creep or hysteresis. They can readily be made nearly identical to one another. Their characteristics can be deliberately and closely controlled. Their surfaces are of excellent optical quality and reflect light in a predictable and reproducible manner without distortion. Another advantage of the membranes of the instant invention is that their elastances are exactly predictable from their diameters, and no delicate or difficult measurements are needed to determine the elastance. The elastance is virtually constant over a useful range of pressure and in any case conforms to a known equation in its dependence on pressure. Membranes according to the invention, if ruptured by excessive pressure, can be quickly reformed without alteration of their characteristics. Accidental disruption of the membrane requires no subsequent recalibration of the transducer. Finally, membranes according to the invention can easily and advantageously be made exceedingly small, much less than 1 mm. in diameter. Consequently, they can attain higher pressure detection sensitivity for a given elastance than conventional solid membranes.

The pressure-measuring system according to the instant invention includes a pressure-responsive membrane formed by the interface between two immiscible fluids bounded by the edge of an orifice in a vessel. One of the fluids is a liquid. Means are provided for detecting the position of the membrane in response to a given pressure. This description of the invention and the advantages thereof will become clearer from the following detailed description taken in conjunction with the accompanying drawings.

BRIEF DESCRIPTION OF THE DRAWINGS

FIG. 2 is an elevational view, in section, of a pressure-responsive membrane according to the instant invention.

FIG. 3 is similar to FIG. 2, showing an alternate construction.

FIG. 4 shows another alternate construction.

FIG. 5 shows another alternate construction.

FIG. 6 shows another embodiment of the instant invention.

FIG. 7 shows a pressure-responsive membrane according to the instant invention responding to a certain pressure.

FIG. 8 shows the position of the same membrane in response to a different pressure.

FIG. 9 shows the position of the same membrane in response to a different pressure.

FIG. 10 shows an alternate construction. Throughout the drawings the same reference numerals have been applied to various corresponding parts.

DETAILED DESCRIPTION

Figure 1:
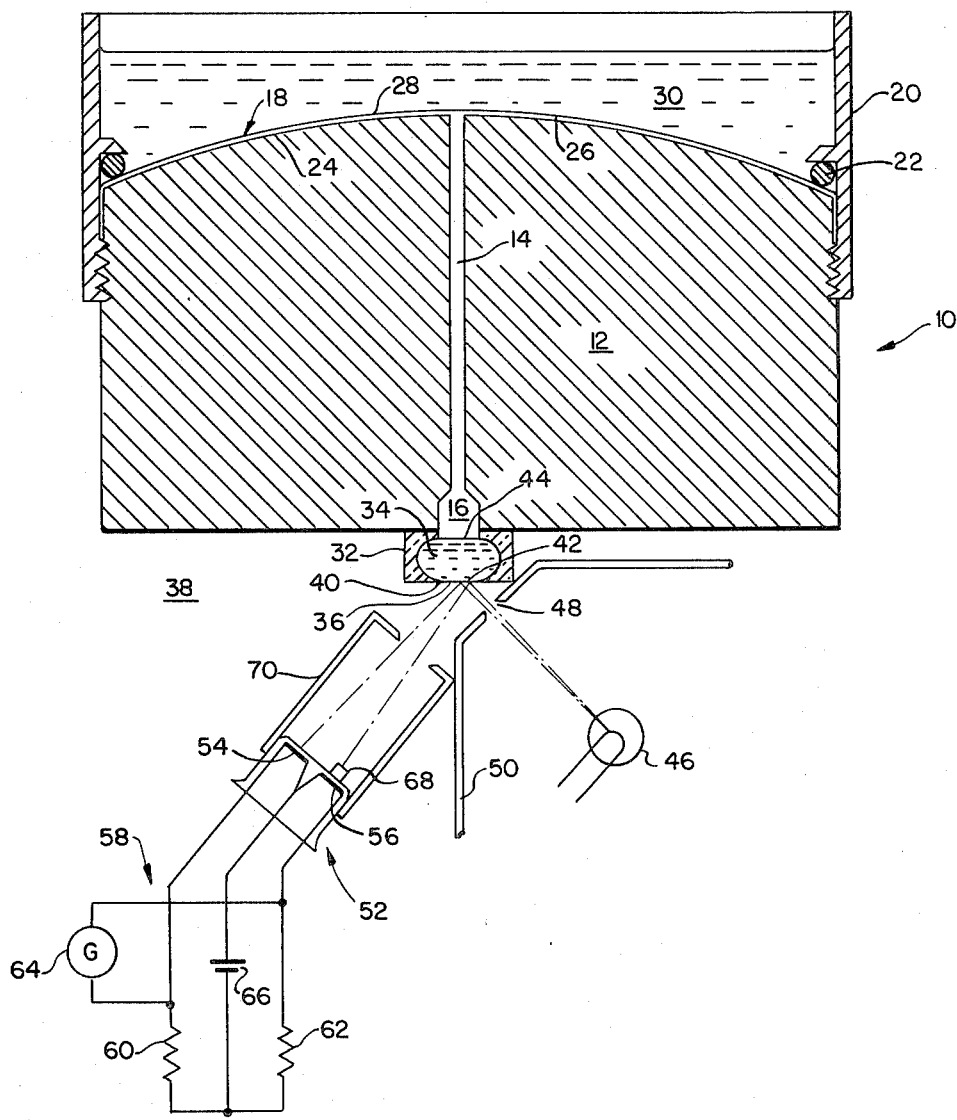
FIG. 1 is a schematic diagram of one embodiment of the instant invention.

FIG. 1 illustrates a typical pressure-measuring system according to the instant invention. The system is shown as an optical system attached to an osmometer 10. Osmometer 10 includes a cell 12 having an inner space 14 filled with a reference solvent 16. A suitable osmotic membrane 18 is rigidly fitted to cell 12 as by cap 20 and O-ring 22. As shown, membrane 18 is disposed over the generally spherical surface 24 of cell 12 in such a way that solvent 16 is in contact with the entire inner surface 26 of membrane 18. The other side 28 of osmotic membrane 18 is in contact with the liquid solution 30 whose osmotic pressure is to be measured. Attached to cell 12 at the lower end of inner space 14 is a vessel 32. In the embodiment shown, vessel 32 is desirably of a substantially unwettable material, such as a tetrafluoroethylene containing polymer or a silicone coated glass. A drop of liquid, 34, immiscible with solvent 16, such as clean mercury, is contained in vessel 32. A pressure-responsive membrane is formed by the interface 36 between liquid 34 and the fluid 38, e.g. air, shown surrounding vessel 32. The interface 36 is bounded by the edge 40 of an orifice 42 in vessel 32. The other side 44 of the liquid 34 is in contact with solvent 16 which exerts a pressure thereon. A light source 46 is arranged so as to illuminate the membrane formed by interface 36. Illumination from light source 46 passes through an aperture 48 in a baffle 50 positioned so as to avoid stray light that would diminish the sensitivity of the instrument. The aperture 48 is just large enough to permit enough light to pass therethrough to illuminate the interface 36 adequately.

The interface 36 is deflected in response to the osmotic pressure in solution 30 either inwardly or outwardly. The arrangement is such that the membrane formed by interface 36 will reflect the light from light source 46, in a manner dependent upon the pressure being sensed, to a sensor or detector circuit indicated generally at 52. Sensor 52, as shown, includes two photosensitive detectors, e.g. photocells 54 and 56, connected in a Wheatstone bridge circuit 58. The Wheatstone bridge circuit also includes two fixed resistors 60 and 62, and a galvanometer 64 is connected across bridge 58 for measurement purposes. The bridge is connected to a suitable source of power 66. Light source 46 may be connected to the same power supply or alternately may be connected to a different power supply. To enhance the sensitivity of sensor circuit 52, the bridge circuit 58 may be rendered asymmetric by means of a small obstacle 68 that partially obstructs the light reaching photocell 56. This asymmetry interacts with the movement of the light beam reflected from interface 36 so as to enhance the response factor or the ratio of the signal caused by a change of pressure to the change of pressure itself. If desired, a suitable shield 70 may be positioned around photocells 54 and 56.

Thus the invention involves the use of a small exposed surface of a liquid as a pressure-sensing membrane, the periphery of the surface being kept in a fixed position by contact with the supporting container. The surface tension of the liquid tends to impart minimal area to the liquid surface. If the periphery of the surface is a plane circle, the surface will be flat in the absence of extraneous force. But if the surface of the liquid is subjected to a net pressure, it will bulge spherically. It will be convex outward if the pressure is greater on the liquid side of the surface, and it will be concave if the pressure is less on the liquid side. The surface, subjected to the interacting forces of surface tension and pressure, behaves like a perfectly elastic membrane.

As will be shown, the most useful forms of the invention are those in which the diameter of the liquid surface is less than a millimeter. Surfaces of such small area will remain in place under a usefully great range of pressure. The elastance of such a membrane can easily be made high enough to produce a measuring system having a high figure of merit and to serve in a pressure transducer suitable for use in a high-speed membrane osmometer. With its very small area, despite the high elastance, the motion of the membrane caused by a small change of pressure is great enough to be readily detected. The motion of the membrane is most easily observed and measured by means of an optical lever with photoconductors in an asymmetric Wheatstone bridge, shown by way of example in FIG. 1.

For proper performance it is essential that the periphery or boundary of the exposed liquid surface be held firmly and reproducibly in one position. If the boundary shifts or wanders, the readings of the pressure transducer will be uncertain. It will be appreciated, then, that the design of the orifice 42 is quite important. The boundary must be maintained at the edge 40 of the orifice 42 in the vessel 32. The boundary is kept at the edge 40 by the forces of wetting, a manifestation of the interfacial tensions existing between pairs of the three media: membrane liquid 34; solid composing the vessel 32; and reference fluid 38 (commonly air).

The design of the orifice takes different forms, depending on whether or not the liquid readily wets and clings to the substance of which the vessel 32 is made. An extreme example of the case of a nonwetting liquid is pure, clean mercury on polytetrafluoroethylene. An extreme example of the case of a wetting liquid is a penetrating oil on metal. For the purposes of the present invention, it is preferable to avoid these extremes. In all cases, it is helpful if the liquid, once in contact with the solid surface, tends to remain in contact over the original area of contact without either spreading or retreating. Mercury on glass that is not quite chemically clean behaves thus, as does pure water on clean glass. However, it must not be supposed that these two cases are similar. Mercury wets glass far less readily than water does. To keep the boundaries of the exposed surfaces of these two liquids in fixed position at the edge of the vessel requires, therefore, two quite different designs of the orifice.

When a nonwetting liquid, such as mercury, is being used, the inner surface of container or vessel 32 must be flat and smooth in the vicinity of the hole so that the mercury 34 will remain in hermetic contact permitting no leakage of the gas or liquid in contact with the exposed surfaces of the mercury. The inner walls of vessel 32 are desirably smoothly concave with no sharp corners so that the mercury will not tend to pull away from the walls at any point near orifice 42. The inner edge 40 of orifice 42 should be smooth and sharp, in order to keep the periphery of the exposed surface of the mercury in fixed contact with the container. The inner edge of orifice 42 desirably is planar so that the elastance of the mercury membrane will be nearly constant, i.e., independent of the net pressure. The walls of orifice 42 desirably are either thin or conically receding so as to afford an unobstructed view of interface 36 from angles of incidence as high as about 45°. The outside of vessel 32 and the walls of orifice 42 should be of low reflectance, to reflect as little unwanted light to the photocells 54 and 56 as possible. The interior of vessel 32 is desirably cleaned thoroughly before introducing mercury 34 since very small particles of dirt caught between the mercury and the edge 40 of orifice 42 might spoil the reproducibility of the membrane's behavior. The open end of vessel 32 must be much larger than orifice 42 so that the surface tension of the meniscus on the far side 44 of the mercury will not compete appreciably with the surface tension at orifice 42. At the same time it must not be so large that the mercury will spill out when the vessel is tilted.

FIG. 2 shows a vessel 32 with orifice 42 similar to that shown in FIG. 1. Vessel 32 is made, for example, by blowing a glass bulb of about 3 mm. inside diameter in the end of a glass capillary tube with a bore of about 1 mm. The end of the bulb is then ground down until the interior is just barely breached. The hole, typically 0.3 mm. in diameter, may be somewhat irregular in outline, but when the bulb is filled with mercury the device will be satisfactory in a pressure transducer so long as the pressures are not too greatly negative. The inner surface of the container is not truly flat, i.e., parallel to the plane of the orifice adjacent the edge of the orifice. As a result, at extreme negative pressures the mercury will tend to pull back out of contact with the edges of the hole. This effect is counterbalanced to some extent by the hydrostatic head of the mercury itself when vessel 32 is positioned as shown in FIG. 1. Thus a positive pressure bias is superimposed on the pressure to be measured.

FIG. 3 shows another design which has some advantages over that of FIG. 2 but is harder to fabricate. The inner walls 72 of the bulb or vessel 32 are convex inward in the immediate vicinity of orifice 42. This convexity will prevent the mercury from pulling away from the edge of orifice 42 when negative pressure sucks the interface 36 in, as shown by dashed line $a$ provided the curvature of surface $a$ does not exceed that of the inner surface 72 of the vessel 32. With positive pressure, mercury 34 will bulge outward as shown at $b$ and its behavior at these pressures is unaffected by the shape of the inside of the vessel 32.

FIG. 4 shows a two-part vessel. A glass bulb 74 is cut off at its equator. A circular end piece 76, shaped like a shallow cup, for example of stainless steel, is machined to fit the end of bulb 74. The concave outer toroidal portion 77 of the inner surface of end piece 76 should have a radius of curvature not less than 1 mm. in any plane through the axis of end piece 76, to discourage the mercury from pulling away from the wall. The flat area of the inner wall 72 surrounding the orifice 42 should be coplanar with the orifice as defined by its inner edge 40, and should extend at least 1 mm. radially beyond the edge 40 on all sides. The orifice 42 is suitable 0.2–0.3 mm. in diameter. Its bounding edge 40 must be sharp and square as seen in transverse section; that is, its lesser radius of curvature (in a plane containing the axis) must be very small relative to its greater radius of curvature (the radius of the orifice itself). Moreover, the edge 40 is desirably coplanar within 1 micron, to ensure a nearly constant elastance of the membrane. The outer walls 78 of orifice 42 are tapered to afford better viewing. The end piece 76 is attached to bulb 74 in a suitable manner such as with a rigid cement and the resultant vessel 32 may then be filled with a liquid.

In the embodiment shown in FIG. 5, a fairly thin disk 80 of material, such as a phenolic molding plastic, preferably black, is drilled nearly through to make a conical cavity 82 perhaps 4 mm. wide. The bottom of cavity 82 is then drilled partly through with a much smaller drill, preferably less than 1 mm. in diameter to make an orifice 42. Orifice 42 can be made neat, round, and sharp edged by placing the disk 80 against a hard metal surface when completing the drilling. The drill will barely break through before encountering increased resistance. The disk is then cemented to a bulb 74 in a suitable manner. The opening in the bottom of bulb 74 is somewhat larger than orifice 42 so that the edges of the bulb will not interfere with the behavior of the mercury or other suitable nonwetting liquid at the orifice 42. It has been found that liquid 34 will cling to disk 80 sufficiently so that it does not pull away from the edge 40 of orifice 42 even under negative pressures sufficient to make the surface quite strongly concave. In this embodiment also the inner wall 72 adjacent edge 40 of orifice 42, being the upper surface of disk 80, is substantially parallel to the plane of orifice 42.

A wet liquid membrane can be made from the interface 36 of any liquid such as water that will wet the walls of vessel 32. There are various degrees of wetness, more or less related to the surface tension of the liquid. High surface tension is desirable to permit the greatest diameter of the membrane for a given elastance and high surface tension is also desirable to avoid undue wetness. The degree of wetness exhibited by pure water with a surface tension of 72 dy/cm. on relatively clean glass is quite satisfactory. The water adheres to those areas with which it is originally placed in contact but at the same time it does not readily flow around corners to encroach upon neighboring areas. The surface tension of water may be considered an approximate practical upper limit for a nonmetallic wetting type liquid. Surface tensions of 20–40 dy/cm. are typical for organic liquids. Most inorganic aqueous solutions have surface tensions quite close to that of water.

The orifice design for a wet liquid is simpler than for a nonwetting liquid. A thin-walled vessel 32 with a sharply cut edge 40 such as shown in FIG. 6 is quite satisfactory. Such a vessel may be made by drawing a standard wall glass tube, without allowing the walls to thicken, to a bore of typically 0.15 mm. If the fine vessel 32 is then carefully scratched, for example with a diamond, and pulled, it will break cleanly with a square edge 40. When filled with a liquid 34 such as water, the liquid will flow to the end of the tube constituting vessel 32 and form a meniscus or interface 36 which is flat when the net pressure is zero. When the net pressure is negative, the interface 36 will be sucked back to form a concave surface as in FIG. 7. If the liquid wets the inside wall well enough, it will not pull back from the end of vessel 32 until the interface 36 is nearly hemispherical. Under positive pressure, the interface 36 will bulge out. If the liquid 34 is not too wet, the periphery of interface 36 will remain at the inner edge 40 of orifice 42 as shown in FIG. 8. This will normally occur when liquid 34 is water and vessel 32 is of glass. However, if the liquid very easily wets the surface of vessel 32, it will spread out over the terminal face 84 of orifice 42, as shown in FIG. 9. The periphery of the exposed interface is then in contact with the terminal edge of the outer wall 86 of vessel 32. When an organic liquid such as 1-bromonaphthalene is used it has been observed that the transition from the configuration of FIG. 7 to that of FIG. 9 occurs quite abruptly at the moment interface 36 begins to grow convex. There is almost no intermediate range in which the configuration of FIG. 8 appears. If the terminal face 84 of vessel 32 were conical, as shown in FIG. 10, a very wet liquid could be kept to the inner edge 40 of orifice 42 under positive pressures.

To protect vessel 32 a shield such as a piece of rubber tubing 88 shown in FIG. 6 can be slipped over vessel 32. If it is black, it will also function as a light trap and cut down unwanted reflections from surfaces other than the interface 36.

A wet liquid system as shown in FIG. 6 can be installed in a transducer system like that of FIG. 1. One simply exchanges one vessel 32 for the other. Since nonmetallic liquids have low reflectance, typically 5 percent, it is desirable to keep the walls of vessel 32 as thin as possible to minimize reflection from its terminal surface. An antireflection coating will help, or the angle of incidence could be made equal to Brewster's angle for the glass and a properly oriented polarizer placed in front of photocells 54 and 56 to exclude light reflected from the glass. If the index of refraction of the glass were high, for example 1.7, Brewster's angle would be 59.5°, while that of water is 53°. Light from the water surface would then reach the photocell even with a flat interface 36, and with any curvature much of the beam would pass through the polarizer.

The theoretical elastance of a liquid membrane bounded by a plane circle is given by the following formula:
$$E = 8T(r^2 - Y^2)/\pi(r^2 + y^2)^3 \quad (i)$$
in which $E$ is the desired elastance of the membrane in microbars per ml.; $T$ is the interfacial tension between the two fluids in dynes per cm.; $r$ is the radius of the orifice 42 and hence interface 36 in cm.; and $y$ is the displacement of the center of the exposed interface of the liquid from the plane of the edge of the orifice in cm. When the curvature of interface 36 is not great this equation may be simplified to:
$$E = 8T/\pi r^4 \quad (ii)$$
$E$ may be more conveniently expressed in microbars per pl. ($\mu$b/pl.). Values of $E$ suitable for high-speed osmometry are 10–100 $\mu$b/pl. For mercury, with the surface or interfacial tension with respect to air equal to 480 dy/cm., an elastance of 10 $\mu$b/pl. requires an orifice diameter of 0.37 mm., and an elastance of 100 $\mu$b/pl. requires a diameter of 0.21 mm. For water, with a surface or interfacial tension with respect to air of 72 dy/cm., an elastance of 10 $\mu$b/pl. requires a diameter of 0.23 mm. and an elastance equal to 100 $\mu$b/pl. requires a diameter of 0.13 mm. Tests have been conducted upon membranes of mercury and water having diameters within the ranges indicated above, and their elastances substantially agree with equation ii.

The pressure range that can be accommodated by a liquid membrane formed by the interface 36 between two fluids, one of which is a liquid, is somewhat limited but is satisfactory in view of the extreme sensitivity (less than 1 $\mu$b) that can be attained with liquid membrane pressure transducers. The pressure is given by the formula:

$$P = 4Ty/(r^2+y^2), \quad \text{(iii)}$$

where $P$ equals the pressure in microbars. When the surface becomes hemispherical, this formula simplifies to:

$$P = 2T/r \quad \text{(iv)}$$

If the pressure is negative, the wet liquid will be sucked back into the vessel at pressures exceeding $2T/r$. If it is positive, the liquid, either wet or dry, will be expelled through the orifice at pressures exceeding $2T/r$. This limiting pressure for an 0.21 mm. diameter mercury interface is 90 millibars, a little under 0.1 atmosphere. For a 0.13 mm. water surface it is 22 millibars. However, these limiting pressures are about $10^5$ times the smallest measurable pressure so that the liquid membrane according to the instant invention offers a rather wide working range.

An example of an optical-lever pressure transducer according to the invention, employing a nonwetting liquid, is the following. The membrane was of mercury, contained in a vessel like that of FIG. 4. The orifice was 0.23 mm. in diameter, giving an elastance of 80 $\mu$b/pl. A net positive pressure of 3 millibars was applied to the mercury, to keep it firmly presses against the edge 40 of the orifice 42, assuring reproducible elastance. The dish-shaped endpiece 76 was of stainless steel, painted black to diminish unwanted reflections. A small flashlight lamp operating on 1.2 watts illuminated the membrane at an angle of incidence of 45° and at a distance of about 1 cm. The lamp was surrounded by a black housing with a pinhole between the filament and the membrane, to confine illumination as nearly as possible to the membrane. The photodetector consisted of a single small, low-resistance cadmium selenide photocell 4 cm. from the membrane. The photocell was covered by an 0.2 mm. slit to enhance its response to angular deflection of the beam. The reflected beam reached the photocell through a narrow black tube with an orifice near the membrane, to reduce stray light. The photocell constituted one arm of a Wheatstone bridge, of which the other three arms were fixed resistors of 0.22 megohm each. The bridge was excited with 18 volts from a battery and it was connected directly to a potentiometric strip-chart recorder. With no added capacitance, the time constant was somewhat less than 1 second. The response factor of the pressure transducer was 1 mv./$\mu$b, an exceedingly high value. The root mean square noise was equivalent to 0.2 $\mu$b. From other experiments, however, it was found that much of the observed noise was due to ambient fluctuations of pressure. The noise inherent in the transducer was calculated to be slightly more than the equivalent of 0.1 $\mu$b. The figure of merit was accordingly about 700 pl.$^{-1}$.

In another experiment, a 3 mm. bulb was blown in the end of a borosilicate glass tube of 6 mm. diameter and 1 mm. bore. The thin end of the bulb was flattened by local heating and suction. A central hole was punched in it with a hot tungsten wire. The wall surrounding the hole was ground to a thickness of 0.2 mm., and this area was etched with hydrofluoric acid and carefully cleaned. A drop of mercury was placed in the bulb. The surface of the mercury exposed in the small hole served as membrane. The effective diameter of the membrane was a little over 0.3 mm. and its elastance about 20 $\mu$b/pl. The motion of the membrane under the influence of pressure was observed with a small Michelson interferometer under a low-power microscope illuminated with a sodium lamp. The response factor of this apparatus, regarded as a pressure transducer, was about 5 fringes per millibar. The precision with which the interferometer could be centered on a fringe corresponded to a standard error of 0.05 fringe, equivalent to 10 microbars. The figure of merit was therefore 2 pl.$^{-1}$, a remarkably good value in view of the drawbacks of interferometry as a means of observing the motion of the liquid membrane.

A third example, in which a wetting liquid was used with an optical lever, is the following. A vessel like that in FIG. 6 was prepared by drawing down a standard-wall borosilicate glass tube of 6 mm. diameter to a slender tip, which was cut by scratching with diamond and pulling. The broken end was virtually flat, showing two small elevations less than 2 microns out of the plane of the rest of the orifice. The inside diameter was 0.14 mm. and the wall thickness less than 0.05 mm. This vessel was filled with de-ionized water, which, owing to traces of organic materials, had a surface tension, after static equilibration, only about two-thirds that of pure water. The elastance of the water membrane, measured interferometrically, was about 45 $\mu$b/pl. The flashlight lamp described above illuminated the membrane at an angle of incidence of 40° and from a distance of 2 cm. The photodetector, 3 cm. from the membrane, consisted of a Clairex CL 704L/2 twin photocell with sinuous elements of Type 4 cadmium selenide, characterized by very low resistance. The two elements constituted adjacent arms of a Wheatstone bridge, the other two arms being fixed resistors of 0.33 megohm. At balance the photocells had resistances of 0.6 megohm. The bridge was excited with 2 to 12 volts. It was made asymmetric by placing a narrow strip of black tape across one element of the twin photocell. Because of the extremely small amount of light reflected from the tiny membrane of water, it was necessary to shield the parts of the apparatus with baffles to minimize stray light. A black rubber tube surrounded the membrane vessel as shown in FIG. 6. Another black tube, 12 mm. long and 3 mm. in inside diameter, confined the incident beam. A barrier with a pinhole closed the end of this tube next to the membrane, in order to confine illumination to the membrane itself. The reflected beam was shielded as in the first example above, and as shown in FIG. 1. When tested as a pressure transducer, the device exhibited a response factor of 1.7 mv./$\mu$b with 6 volts of excitation. This is an enormous response for a transducer of such elastance. It amounts to over 70 mv. per picoliter of membrane displacement, and yet the excitation voltage could have been greatly increased. There is, of course, no need for such amplification, since it only magnifies the limiting noise. The time constant, without added capacitance, was about 1 second. The root mean square noise was equivalent to 0.12 $\mu$b. Much of this, however, represented ambient pressure fluctuation. The inherent instrumental noise was calculated to correspond to 0.055 $\mu$b, yielding a figure of merit of 800 pl$^{-1}$. The instrument can thus detect a volume displacement of about 1 cubic micron ($10^{-12}$ ml.).

In a transducer such as the one just described, it will be apparent that the high response factor is incompatible with the full pressure range of the device. The bridge will run out of voltage. Observations over an extended range of pressure therefore inevitably reveal a marked nonlinearity. The above-described water-membrane pressure transducer, tested over a range of 20 millibars, revealed extreme nonlinearity, with several reversals of direction of response. This is, however, more an optical than an electrical phenomenon, resulting from the complex changes of form of the reflected beam with changing curvature of the membrane. In one trial, the highest response factor was found to remain constant over a range of 200 $\mu$b. Another range of 400 $\mu$b exhibited a constant but somewhat smaller response factor. Still other ranges were found in which the factor was constant over a range of over 1,000 $\mu$b (1 mb). In all such ranges the response factor, though considerably less than the greatest, was adequate for fully exploiting the sensitivity of the instrument; that is, the noise could be revealed. Of particular interest is the fact that this transducer exhibited a range of negative pressure as great as 15 mb over which the response was a nearly perfect logarithmic function of the pressure. The response factor was here inversely proportional to the net pressure measured from a predetermined reference point. Such a characteristic would have special value in recording a wide range of pressures with maximal accuracy on a single scale, as the logarithmic response would suppress the peak excursions while displaying much smaller excursions with fidelity.

In general, it may be stated that a liquid surface is perfectly elastic and without hysteresis to all intents and purposes. Liquid membranes according to the invention are relatively easy to fabricate, test, and adjust, despite their small size. In a manufacturing process, orifices for the liquid membranes can be made reproducibly much more easily than can solid membranes of comparable properties. When used in an optical measuring system like those shown, the liquid surface offers superior optical quality. With a well-made orifice, the surface will be almost perfectly flat or spherical.

The properties of the membrane are fully determined by the diameter of the orifice and the surface tension or interfacial tension of the liquid. If the orifice is a plane circle, the elastance and other characteristics are easily calculated by the formulas given above, and the elastance is nearly independent of pressure over the central part of the range. Liquids of high boiling point have a low thermal coefficient of surface tension. Even for water, the surface tension changes only 0.2 percent per degree centigrade.

The liquid membranes or interfaces cannot break as solids break. If accidentally disrupted by excessive pressure, a liquid membrane is easily and quickly replaced and reformed. When replaced, the membrane's properties are unchanged. Although a glass tube like that of FIG. 6 is very fragile, it is easy to make another with a nearly identical orifice.

It is easier to fabricate liquid membranes in the submillimeter range of diameters than conventional solid membranes. For a given elastance, the linear displacement of the membrane per microbar is inversely proportional to its area. Therefore it is much easier to get a high response factor, for a given elastance, with the smaller liquid membranes. Solid membranes, if they could be made equally small (e.g., 0.2 mm. in diameter) would have to be excessively thin.

In comparing wetting with nonwetting liquids, if the liquids themselves are otherwise similar e.g., transparent $E$ of similar surface tension, it may be stated that wetting liquids are much easier to use. Suitable orifices, like that shown in FIG. 6, are much easier to make than any of the orifices of FIGS. 2–5. The diameter of a tubular orifice as in FIG. 6 is easier to control. The tube can be drawn down with a very gentle taper and broken at the point where the desired diameter occurs. Another important advantage of wetting liquids is that the membrane is not disturbed or distorted by traces of dirt. Among nonwetting liquids, however, mercury, being a metal, has advantages over nonmetallic liquids. It has a far higher surface tension, permitting, for a given elastance, larger orifices and a greater range of pressure and better linearity. It has much higher reflectance and usually lower vapor pressure and thermal coefficient of surface tension. The reflected beam in an optical-lever pressure transducer can be made much brighter with mercury than with a nonmetallic liquid, affording lower relative shot noise and quicker response. That this is not a serious problem, however, is evident from the third example (the water membrane) described above. It is likely that if mercury were to be employed in an orifice that it wets, e.g., a fine tube of platinum with an amalgamated surface, most of the advantages of the metallic liquid and the wetting liquid could be combined.

A special advantage of the liquid membrane serving in a pressure transducer for a membrane osmometer based on the principle employed by Hansen is that the reference solvent 16 can be the liquid of which the membrane is formed. If that case, channel 14 (FIG. 1) is replaced by a narrow tubular vessel terminating at the lower end in an orifice like that of FIG. 6. In assembling such as osmometer, it is only necessary to apply a drop of the solvent to channel 14 and then to attach wet membrane 18 with clamp 20. The osmometer fills itself, automatically forming the membrane. With a solid membrane, the process of filling, with complete avoidance of gas bubbles, is far more troublesome. Any evaporation or thermal expansion of the solvent 16 will be immediately compensated by diffusion of solvent through the membrane from the reference or standard solution. Since osmotic pressures registered by such an osmometer are normally negative, the difficulty shown in FIG. 9 will hardly arise. In such an osmometer, either the solvent 16 or the osmotic membrane 18 can be quickly changed by the user.

In the examples described above, both the optical lever and the interferometer have been employed as means of observing and measuring the displacement of the membrane under the influence of pressure. The optical lever, especially with photocells in an asymmetric Wheatstone bridge, has the advantages of simplicity, great sensitivity, and ease of construction, adjustment, and use. The interferometer, on the other hand, has the advantage of providing a direct measurement of the displacement of the membrane. It therefore gives a reading that is just as linear as the constancy of the elastance of the membrane permits. Such linearity is not enjoyed by the optical-lever pressure transducer. However, in many applications the pressure transducer acts as a null meter, being used only for displaying small departures from a balanced state and for enabling reestablishment of the balance. In such applications sensitivity is of first importance and linearity is not. Although pressure transducers according to the instant invention have been shown with optical levers and interferometers, it will be appreciated that the displacement of the membrane can also be measured by other means, and thus the invention is not limited to use in conjunction with optical levers and interferometers.

In all of the examples shown, the membrane is the interface between a liquid and air. The second fluid can, however, consist of any other gas or of any liquid immiscible with the first one. For use in an optical measuring system, one of the liquids should be transparent. For example, the membrane can consist of the interface between mercury and an aqueous solution, formed at an orifice like one of those of FIGS. 2–5.

Although the invention has been described with particular reference to an osmometer, it could be used in pressure transducers for many other purposes, as in microbarometers, differential manometers, measurement of low vapor pressures, nondispersive infrared analyzers, sphygmomanometers, measurement of fluid pressures in very small animals or other biological entities, microphones, studies of turbulence, rate-of-climb indicators, anemometers, orifice flowmeters, measurement of fluid drag, depth indicators, level indicators, pressure controllers, and manostats. Liquid membranes according to the invention can be used for other purposes than the measurement of pressure, for example, the measurement of the surface or interfacial tension of the liquid itself, or as adjustable mirrors of spherical or other form. Accordingly, the invention is not to be limited to the particular embodiments disclosed, but only by the claims wherein what is claimed is:

I claim:
1. A pressure-measuring system comprising:
   a. a pressure-responsive membrane formed by the interface between two immiscible fluids bounded by the edge of an orifice in a vessel, one of the fluids being a liquid;
   b. means for detecting the position of the membrane in response to a given pressure.
2. The pressure-measuring system of claim 1 wherein the radius of curvature of the edge of the orifice around the area of the liquid surface exposed in the orifice is small compared to the radius of the exposed area of the liquid surface.
3. The pressure-measuring system of claim 1 wherein the diameter of the exposed area of the liquid surface is such that the surface tension of the liquid is sufficient to retain the liquid in the orifice over the range of pressures to be measured.
4. The pressure-measuring system of claim 1 wherein the inner wall of the vessel adjacent the edge of the orifice is parallel to the plane of the orifice.
5. The pressure-measuring system of claim 1 wherein the means for detecting the position of the membrane include:
   a. a light source positioned to illuminate the membrane so that the membrane reflects the light in a manner dependent upon the position of the membrane in response to a given pressure; and b. a sensor illuminated by the reflected light including a photosensitive detector connected in a Wheatstone bridge circuit.

6. The pressure-measuring system of claim 5 including the following additional elements:
   a. a cell having an inner space filled with a reference solvent;
   b. an osmotic membrane rigidly fitted to the cell, the outer surface of the osmotic membrane being adapted to be in contact with the liquid solution whose osmotic pressure is to be measured, the inner surface of the membrane being in contact with the solvent, and the pressure-sensitive membrane has two sides and is positioned with one side in contact with the solvent so as to respond to the osmotic pressure developed across the osmotic membrane.

7. The pressure-measuring system of claim 1 wherein the membrane is bounded by a plane circle.

8. The pressure-measuring system of claim 7 wherein the radius of the exposed area of the liquid surface satisfies the following relationship:
$$E=8T(r^2-y^2)/\pi(r^2+y^2)^3$$
in which $E$ is the desired elastance of the membrane in $\mu$b/ml.; $T$ is the interfacial tension between the two fluids in dy/cm.; $r$ is the radius in cm.; $y$ is the displacement of the center of the exposed surface of the liquid from the plane of the edge of the orifice in cm.

9. The pressure-measuring system of claim 7 wherein the radius of the exposed area of the liquid surface satisfies the following relationship:
$E=8T/\pi r^4$ in which $E$ is the desired elastance of the membrane in $\mu$b/ml.; $T$ is the interfacial tension between the two fluids in dy/cm.; and $r$ is the radius in cm.

10. The pressure-measuring system of claim 7 wherein the pressure upon the membrane is determined by the following relationship:
$$P=4Ty/(r^2+y^2)$$
where $P$ is the pressure in $\mu$b; $T$ is the interfacial tension between the two fluids in dy/cm.; $r$ is the radius in cm.; $y$ is the displacement of the center of the exposed surface of the liquid from the plane of the edge of the orifice in cm.

* * * * *